United States Patent
Watanabe

(10) Patent No.: US 8,755,081 B2
(45) Date of Patent: Jun. 17, 2014

(54) DEVICES, METHODS, AND MEDIA FOR USING COMPATIBLE COMMANDS TO CONTROL RECORDING DEVICES

(75) Inventor: Michiaki Watanabe, Hachioji (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 13/344,147

(22) Filed: Jan. 5, 2012

(65) Prior Publication Data

US 2012/0170067 A1  Jul. 5, 2012

(30) Foreign Application Priority Data

Jan. 5, 2011  (JP) ................................ 2011-000517

(51) Int. Cl.
*G06F 3/12* (2006.01)

(52) U.S. Cl.
CPC ............ *G06F 3/1206* (2013.01); *G06F 3/1285* (2013.01); *G06F 3/1247* (2013.01); *G06F 3/1228* (2013.01)
USPC ......... 358/1.6; 358/1.14; 358/1.15; 358/1.13; 358/1.16

(58) Field of Classification Search
CPC .............................. G06F 3/1247; G06F 3/1245
USPC .................... 358/1.13–1.16, 1.1, 1.6
See application file for complete search history.

(56) References Cited

U.S. PATENT DOCUMENTS

| | | | |
|---|---|---|---|
| 6,587,971 B1 | 7/2003 | Kai | |
| 6,825,941 B1 * | 11/2004 | Nguyen et al. | 358/1.15 |
| 7,256,901 B2 * | 8/2007 | Ferlitsch | 358/1.13 |
| 7,773,248 B2 | 8/2010 | Kadota | |
| 2002/0018234 A1 * | 2/2002 | Fu et al. | 358/1.15 |
| 2002/0171857 A1 * | 11/2002 | Hisatomi et al. | 358/1.13 |
| 2003/0058285 A1 * | 3/2003 | Jin | 345/810 |
| 2003/0179402 A1 * | 9/2003 | Sandfort et al. | 358/1.15 |
| 2003/0184782 A1 * | 10/2003 | Perkins et al. | 358/1.13 |
| 2004/0122932 A1 * | 6/2004 | Mickeleit | 709/223 |
| 2004/0190010 A1 * | 9/2004 | Miyata | 358/1.1 |
| 2005/0046886 A1 * | 3/2005 | Ferlitsch | 358/1.13 |
| 2005/0132094 A1 * | 6/2005 | Wu | 710/8 |
| 2007/0177192 A1 * | 8/2007 | Wang | 358/1.15 |
| 2008/0068655 A1 | 3/2008 | Kimura | |
| 2010/0100832 A1 * | 4/2010 | Wang et al. | 715/764 |

FOREIGN PATENT DOCUMENTS

| | | |
|---|---|---|
| JP | 10-97393 A | 4/1998 |
| JP | 2005-190407 A | 7/2005 |
| JP | 2006-072525 A | 3/2006 |
| JP | 2008-097574 A | 4/2008 |
| JP | 2010-204777 A | 9/2010 |

* cited by examiner

*Primary Examiner* — Dennis Dicker
(74) *Attorney, Agent, or Firm* — Nutter McClennen & Fish LLP; John J. Penny, Jr.; Michael P. Visconti, III

(57) ABSTRACT

Plural recording devices that are compatible with different commands are controlled. The host computer 11 has a compatible command acquisition unit 30 that gets compatible command information identifying the commands with which the printer P is compatible, and a printer driver execution unit 21. Based on compatible command information acquired by the compatible command acquisition unit 30, the printer driver execution unit 21 manages what commands are compatible with the printer P, and outputs compatible commands to control the printer P.

6 Claims, 7 Drawing Sheets

< ADVANCED PRINTER P1 >

| OUTPUT COMMAND | COMPATIBILITY |
|---|---|
| ⋮ | ⋮ |
| COVER STATUS REQUEST COMMAND CY | COMPATIBLE |
| NO-PAPER STATUS REQUEST COMMAND PY | COMPATIBLE |
| CUTTER POSITION REQUEST COMMAND NY | COMPATIBLE |
| GENERAL STATUS REQUEST COMMAND TY | COMPATIBLE |
| LOW PAPER STATUS REQUEST COMMAND QY | COMPATIBLE |
| ⋮ | ⋮ |

FIG. 5A

< STANDARD PRINTER P2 >

| OUTPUT COMMAND | COMPATIBILITY |
|---|---|
| ⋮ | ⋮ |
| COVER STATUS REQUEST COMMAND CY | COMPATIBLE |
| NO-PAPER STATUS REQUEST COMMAND PY | COMPATIBLE |
| CUTTER POSITION REQUEST COMMAND NY | COMPATIBLE |
| GENERAL STATUS REQUEST COMMAND TY | INCOMPATIBLE |
| LOW PAPER STATUS REQUEST COMMAND QY | INCOMPATIBLE |
| ⋮ | ⋮ |

FIG. 5B

| ORIGINAL COMMAND FIELD | SUBSTITUTE COMMAND FIELD | OUTPUT ORDER FIELD |
|---|---|---|
| ⋮ | ⋮ | ⋮ |
| GENERAL STATUS REQUEST COMMAND TY | COVER STATUS REQUEST COMMAND CY<br><br>NO-PAPER STATUS REQUEST COMMAND PY<br><br>CUTTER POSITION REQUEST COMMAND NY | OUTPUT ORDER DATA |
| ⋮ | ⋮ | ⋮ |

FIG. 7

DEVICES, METHODS, AND MEDIA FOR USING COMPATIBLE COMMANDS TO CONTROL RECORDING DEVICES

This application claims priority under 35 U.S.C. §119 to Japanese Patent Application No. 2011-000517 filed on Jan. 5, 2011, the entire disclosure of which is expressly incorporated by reference herein.

BACKGROUND

1. Technical Field

The present invention relates to a control device that controls a recording device, a recording system that includes the recording device and the control device, a control method for the control device, and a storage medium that stores a program for controlling the control device.

2. Related Art

Recording systems that include a control device (host device) to which a driver for a recording device such as a printer is installed, and a recording device connected to the control device, and record by the recording device as controlled by the control device as a result of communication between the control device and the recording device using a function of the printer driver, are known from the literature. See, for example, Japanese Unexamined Patent Appl. Pub. JP-A-2006-72525.

The commands with which a particular recording device is compatible, meaning the commands input from the control device that the recording device can process, vary according to the model and version of the recording device. As a result, a printer driver is typically written for each particular model or version of recording device, and the appropriate printer driver is installed to the control device.

However, when printer drivers are developed for specific models and versions of recording devices, the number of printer drivers that must be written tends to increase as the number of models and versions of recording devices increase, resulting in increased development cost and installation problems. To reduce the cost of development and make installation easier, and reduce the number of printer drivers that must be developed and installed, the ability to control plural recording devices that are compatible with different command languages by a control device to which a single printer driver is installed is therefore desirable.

SUMMARY

A control device and method according to at least one embodiment of the invention enable controlling a plurality of recording devices that are compatible with different command systems.

One aspect of the invention is a control device that can connect to a recording device, and includes a storage unit that stores command information including information about the command compatibility of each of a plurality of different recording devices; a compatible command acquisition unit that acquires compatible command information from the connected recording device, the compatible command information including information identifying the commands with which the recording device is compatible; and a recording control unit that selects and outputs to the recording device a command that is compatible with the connected recording device based on the compatible command information acquired by the compatible command acquisition unit and the command information stored in the storage unit.

With this configuration the control device can learn and manage which commands are compatible with the connected recording device, and control the recording device by outputting commands with which the recording device is compatible. As a result, each of plural recording devices that are compatible with different commands can be controlled by selecting and outputting the commands that are compatible with the connected recording device. Commands that are incompatible with the connected recording device are not selected and are not sent to the recording device.

In a control device according to another aspect of the invention, the recording device returns the compatible command information in response to a request command requesting the compatible command information; and the compatible command acquisition unit acquires the compatible command information from the recording device by outputting the request command to the recording device.

In this aspect of the invention the compatible command acquisition unit can acquire compatible command information by a simple communication with the recording device using a request command. The recording device can respond to request commands, the control device can easily acquire compatible command information by communicating with the recording device, and developing software such as a driver for controlling the recording device is simple.

In a control device according to another aspect of the invention, the recording control unit stores information that is contained in the compatible command information acquired from the recording device by the compatible command acquisition unit and identifies commands that are compatible with the connected recording device related to the command information in the storage unit.

This aspect of the invention enables desirably managing compatible command information that is acquired from the recording device and identifies commands that are compatible with the recording device, and previously stored command information, and controlling the recording device using commands that are compatible with the recording device.

In a control device according to another aspect of the invention, the recording device control unit converts a command that is incompatible with the connected recording device to a substitute command that is compatible with the connected recording device, and outputs the substitute command to the recording device.

When a command is not compatible with the connected recording device, this aspect of the invention enables causing the recording device to execute a process that is equivalent to the process called by the incompatible command.

In a control device according to another aspect of the invention, the recording control unit converts a command that is incompatible with the connected recording device to a plurality of substitute commands that are compatible with the connected recording device and in combination can substitute for the incompatible command, and outputs the substitute commands to the recording device.

There are situations in which a command that is incompatible with the connected printing device cannot be replaced with a single command that is compatible with the recording device, but can be replaced by a combination of plural compatible commands.

In such situations this embodiment of the invention enables replacing a command that is incompatible with the connected recording device with a combination of other compatible commands that cause the recording device to perform a process equivalent to the process invoked by the incompatible command. In this case, information related to the one command or combination of plural commands that can be substituted is stored related to the one incompatible command in a storage unit.

In a control device according to another aspect of the invention, the recording control unit stores in the storage unit information related to an output order of the plural commands that are output when a plurality of commands are combined and output to the recording device to substitute for an incompatible command, and references the storage unit and outputs the plural commands to the recording device based on the information related to the output order.

When a plurality of commands are combined and output to substitute for a command that is incompatible with the recording device, this aspect of the invention enables sending the commands in a substitute order that achieves the same process result when the order of the commands can affect the process result on the recording device side. Furthermore, by predetermining the order in which commands are sent, the control device can communicate reliably and smoothly with the recording device.

Another aspect of the invention is a control method for a control device is connectable to a recording device and stores command information including information about the command compatibility of each of a plurality of different recording devices, the control method including steps of: acquiring compatible command information from the connected recording device, the compatible command information including information identifying the commands with which the recording device is compatible; and selecting and outputting to the recording device a command that is compatible with the connected recording device based on the acquired compatible command information and the stored command information.

With the control method according to this aspect of the invention, the control device can learn and manage which commands are compatible with the connected recording device, and control the recording device by outputting commands with which the recording device is compatible. As a result, each of plural recording devices that are compatible with different commands can be controlled by selecting and outputting the commands that are compatible with the connected recording device. Commands that are incompatible with the connected recording device are not selected and are not sent to the recording device.

Another aspect of the invention is a storage medium storing a program that is executed by a control unit that controls parts of a control device that is connectable to a recording device and stores command information including information about the command compatibility of each of a plurality of different recording devices in a storage unit, the program causing the control unit to function as: a compatible command acquisition unit that acquires compatible command information from the connected recording device, the compatible command information including information identifying the commands with which the recording device is compatible; and a recording control unit that generates and outputs to the recording device a command that is compatible with the connected recording device based on the compatible command information acquired by the compatible command acquisition unit and the command information stored in the storage unit.

By executing the program stored to the storage medium according to this aspect of the invention, the control device can learn and manage which commands are compatible with the connected recording device, and control the recording device by outputting commands with which the recording device is compatible. As a result, each of plural recording devices that are compatible with different commands can be controlled by selecting and outputting the commands that are compatible with the connected recording device. Commands that are incompatible with the connected recording device are not selected and are not sent to the recording device.

Further preferably, the recording device is a printer, and the program is included in the printer driver.

By installing the program from an external storage medium to a storage medium of the control device, the program can operate on the control device as part of the printer driver for the installed printer.

Effect of the Invention

At least one embodiment of the invention enables controlling a plurality of recording devices that are compatible with different commands.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5A is a compatible command management database for the advanced printer.

FIG. 5B is a compatible command management database for the standard printer.

FIG. 7 shows an example of a substitute command management database.

DESCRIPTION OF EMBODIMENTS

A preferred embodiment of at least one embodiment of the present invention is described below with reference to the accompanying figures.

Figure 1:
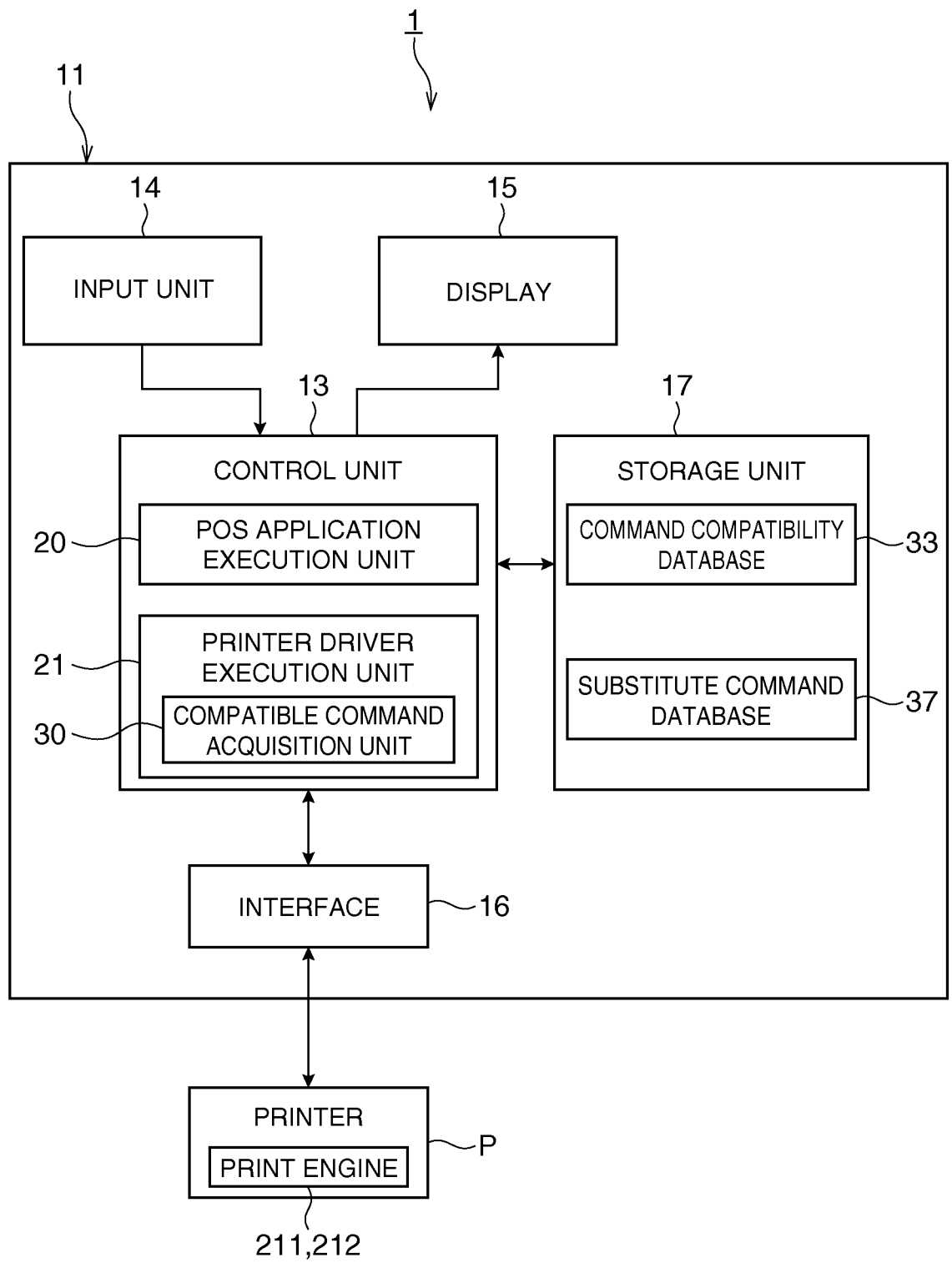
FIG. 1 is a block diagram showing the functional configuration of a recording system.

FIG. 1 is a block diagram showing the configuration of a recording system 1 according to at least one embodiment of the invention.

As shown in FIG. 1, the recording system 1 includes a host computer 11 (control device) and a printer P (recording device) that is connected so that it can communicate with the host computer 11.

The host computer 11 is a POS terminal that is installed at a checkout counter in a retail store, for example, and has an installed point-of-sale management system (POS system) that handles sales transactions and payment processing, and issues a receipt by a printer P for each transaction. Issuing a receipt that a receipt is created by recording information related to the products purchased in a transaction and specific images such as a store logo on thermal roll paper, for example, and cutting the printed portion from the roll of thermal paper.

As shown in FIG. 1, the host computer 11 includes a control unit 13, input unit 14, display 15, interface 16, and storage unit 17.

The control unit 13 centrally controls the host computer 11, and includes a CPU that runs programs, ROM that stores the basic control program executed by the CPU, RAM providing working memory that temporarily stores the programs run by and data processed by the CPU, and other peripheral circuits as needed. The control unit 13 includes a POS application execution unit 20 and a printer driver execution unit 21 (recording control unit) as further described below.

A keyboard with an enter key and other keys, a mouse, a barcode scanner, a card reader, or other input devices that are operated by the operator are connected to the input unit 14, which detects operation of the input device and outputs corresponding operating signals to the control unit 13.

The display 15 is a display panel such as an LCD panel, and presents information such as the content and results of the sales transaction process and payment process as controlled by the control unit 13.

The interface 16 communicates with the printer P according to a known communication protocol as controlled by the control unit 13.

The storage unit 17 includes a hard disk drive, flash memory, or other nonvolatile memory device, and stores data rewritably. The data stored to the storage unit 17 is further described below.

The printer P may be an advanced (high level) printer P1 with high performance and advanced functionality, or a standard (low level) printer P2 with less performance and functionality, and either printer P can be connected to the host computer 11.

Each printer P is a thermal line printer that produces receipts by recording text and images by applying heat by a line thermal head (not shown in the figure) to the recording surface of the thermal roll paper while conveying the thermal roll paper from the paper roll by a conveyance mechanism (not shown in the figure), and then cutting the thermal roll paper at a specific position by a cutting mechanism (not shown in the figure), as controlled by the host computer 11.

The advanced printer P1 is a printer P that is a more advanced model than the standard printer P2. While described in further detail below, the advanced printer P1 and standard printer P2 differ both in their physical configurations and in the commands with which they are compatible (the commands input from the host computer 11 that they can process).

At the same time, the advanced printer P1 and standard printer P2 are developed and produced by the same manufacturer in a common development environment, share a common command language (system) and protocol for command communication, and perform essentially the same process in response to any same command. For example, both advanced printer P1 and standard printer P2 are compatible with a command called command C1. Command C1 has the same meaning for the advanced printer P1 and the standard printer P2, which execute the same process in response to an input command C1 when command C1 is input according to the same communication protocol, and output the same command according to the same communication protocol when returning a command of the same intent in response to the input command C1.

Figure 2A:
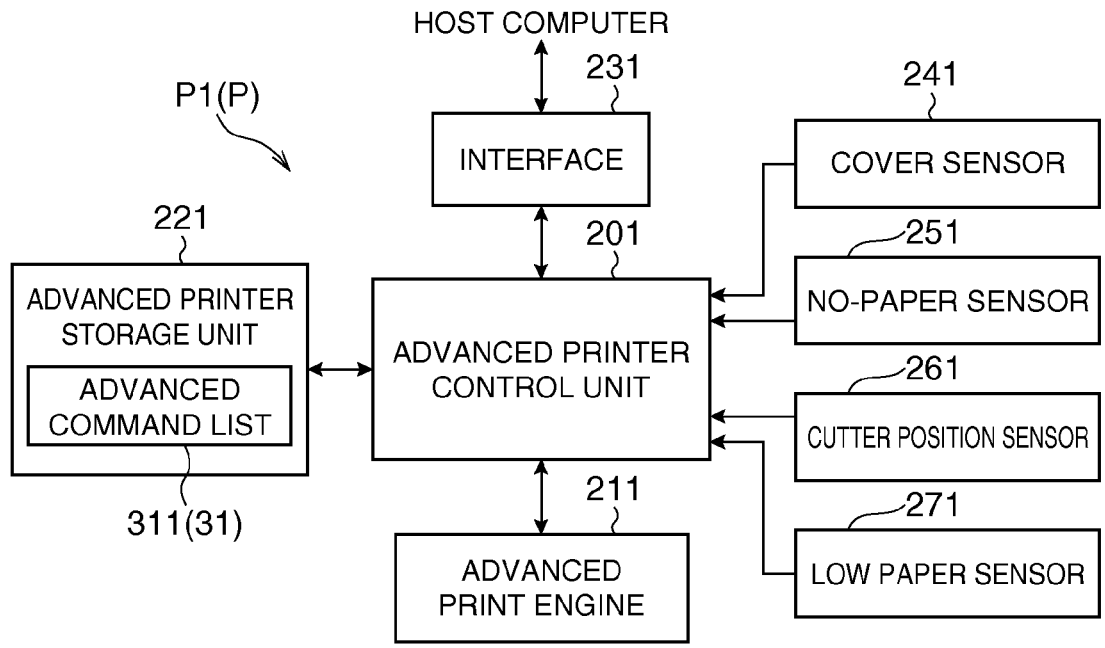
FIG. 2A is a block diagram showing the functional configuration of an advanced printer.
Figure 2B:
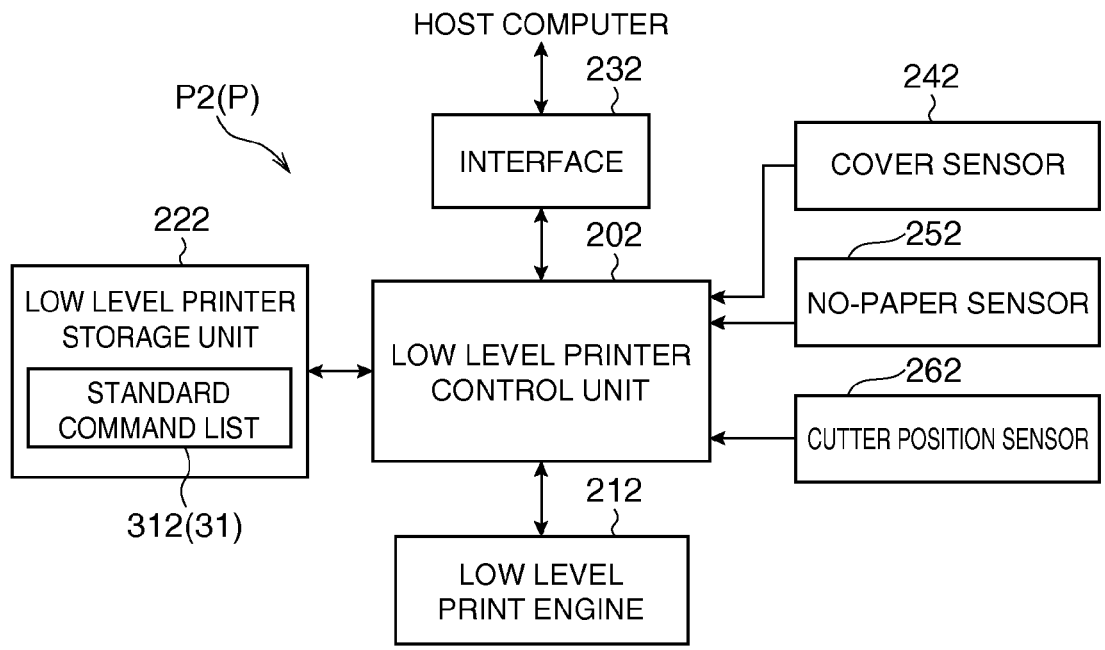
FIG. 2B is a block diagram showing the functional configuration of a standard printer.

FIG. 2A and FIG. 2B are block diagrams showing the functional configuration of the printer P, FIG. 2A showing the advanced printer P1 and FIG. 2B showing the standard printer P2.

As shown in FIG. 2A, the advanced printer P1 has an advanced (high level) printer control unit 201, advanced (high level) print engine 211, advanced (high level) printer storage unit 221, and interface 231.

The advanced printer control unit 201 centrally controls the advanced printer P1, and includes a CPU, ROM, RAM, and other peripheral circuits as needed.

The advanced print engine 211 operates the line thermal head, a conveyance motor that drives a platen roller to convey the thermal roll paper, and a cutter drive motor that drives the cutter of the cutting mechanism as controlled by the advanced printer control unit 201 while monitoring output from various sensors to record images on the thermal roll paper, cut the thermal roll paper after images are recorded, and issue a receipt.

The advanced printer storage unit 221 includes a hard disk drive and nonvolatile memory such as flash memory, and stores data so that it can be written over. The data stored in the advanced printer storage unit 221 is described below.

The interface 231 communicates with the host computer 11 according to a specific communication protocol as controlled by the advanced printer control unit 201.

A cover sensor 241, no-paper sensor 251, cutter position sensor 261, and low paper sensor 271 are connected to the advanced printer control unit 201.

A roll paper compartment (not shown in the figure), which is a space for holding the thermal roll paper, and an access cover (not shown in the figure) that opens and closes the opening to the roll paper compartment, are provided in the case of the advanced printer P1.

The cover sensor 241 is a sensor that detects if the access cover is open or closed. The no-paper sensor 251 is a sensor that detects if the paper roll stored in the roll paper compartment has been consumed and there is no paper left (an out-of-paper state).

The advanced printer control unit 201 determines if the access cover is open or closed based on output from the cover sensor 241, and determines if the paper compartment is empty based on output from the no-paper sensor 251.

The low paper sensor 271 is a sensor that detects if the amount of thermal roll paper remaining in the roll paper compartment has dropped below a specific level. Based on output from the low paper sensor 271, the advanced printer control unit 201 detects if the amount of remaining thermal roll paper has dropped below a specific level.

The advanced printer P1 also has a cutter mechanism for cutting the thermal roll paper, and this cutter mechanism cuts the thermal roll paper by moving a movable knife. For safety, this cutter mechanism is configured so that the cutter mechanism starts cutting the thermal roll paper only if the movable knife is in a specific standby position.

The cutter position sensor 261 is a sensor that detects if the movable knife is in this standby position. Based on output from the cutter position sensor 261, the advanced printer control unit 201 detects if the movable knife is in the standby position.

As shown in FIG. 2B, the standard (low level) printer P2 has a standard (low level) printer control unit 202, standard (low level) print engine 212, standard (low level) printer storage unit 222, interface 232, cover sensor 242, no-paper sensor 252, and cutter position sensor 262.

The standard printer control unit 202, standard print engine 212, standard printer storage unit 222, interface 232, cover sensor 242, no-paper sensor 252, and cutter position sensor 262 are identical to the advanced print engine 211, advanced printer storage unit 221, interface 231, cover sensor 241, no-paper sensor 251, and cutter position sensor 261 of the advanced printer P1 described above, and further description thereof is thus omitted.

As will be known by comparing FIG. 2A and FIG. 2B, the standard printer P2 does not have a low paper sensor 271, and thereby differs functionally from the advanced printer P1.

The basic operation of the recording system 1 when issuing one receipt is described next through the following description of the POS application execution unit 20 and printer driver execution unit 21.

By executing a POS application previously installed to the host computer 11, the POS application execution unit 20 accesses a specific server containing a database such as the product master for each transaction with a customer; acquires information to be recorded on the receipt, including information denoting the products purchased in the transaction, product price information, and total purchase information; generates print data for the images to be recorded on the receipt based on the acquired information; and outputs to the printer driver execution unit 21.

By executing a printer driver previously installed to the host computer 11, the printer driver execution unit 21 generates and outputs to the printer P control commands conforming to the command system of the printer P based on the print data input from the POS application execution unit 20. These control commands include a command causing the conveyance mechanism of the printer P to convey the thermal roll paper, the image data for images to be recorded on the thermal roll paper and commands to drive the line thermal head and record the images, and a command causing the cutter mechanism to cut the thermal roll paper.

The printer-side control unit of the printer P to which the control commands are input controls the print engine (advanced print engine 211 or standard print engine 212) according to the control commands, and executes the operations producing a receipt.

As described above, however, the advanced printer P1 and standard printer P2 are different models and are compatible with different commands.

Using the technology of the related art, a dedicated printer driver conforming to the command system of the advanced printer P1 must be developed for the advanced printer P1, and another dedicated printer driver conforming to the command system of the standard printer P2 must be developed for the standard printer P2. If the advanced printer P1 is connected to the host computer 11, the printer driver specific to that advanced printer P1 is installed, and the advanced printer P1 is controlled by the functions of the installed printer driver. However, if the standard printer P2 is connected to the host computer 11, the printer driver specific to that standard printer P2 is installed, and the standard printer P2 is controlled by the functions of the installed printer driver.

This creates the need to develop and install a printer driver specific to each model of printer P, increasing the cost of development and potential installation problems, including simply the need to install the dedicated driver.

This embodiment of the invention solves this problem by enabling controlling both the advanced printer P1 and standard printer P2 using a common printer driver, thereby reducing the cost of printer driver development and installation trouble.

Figures 3A, 3B:
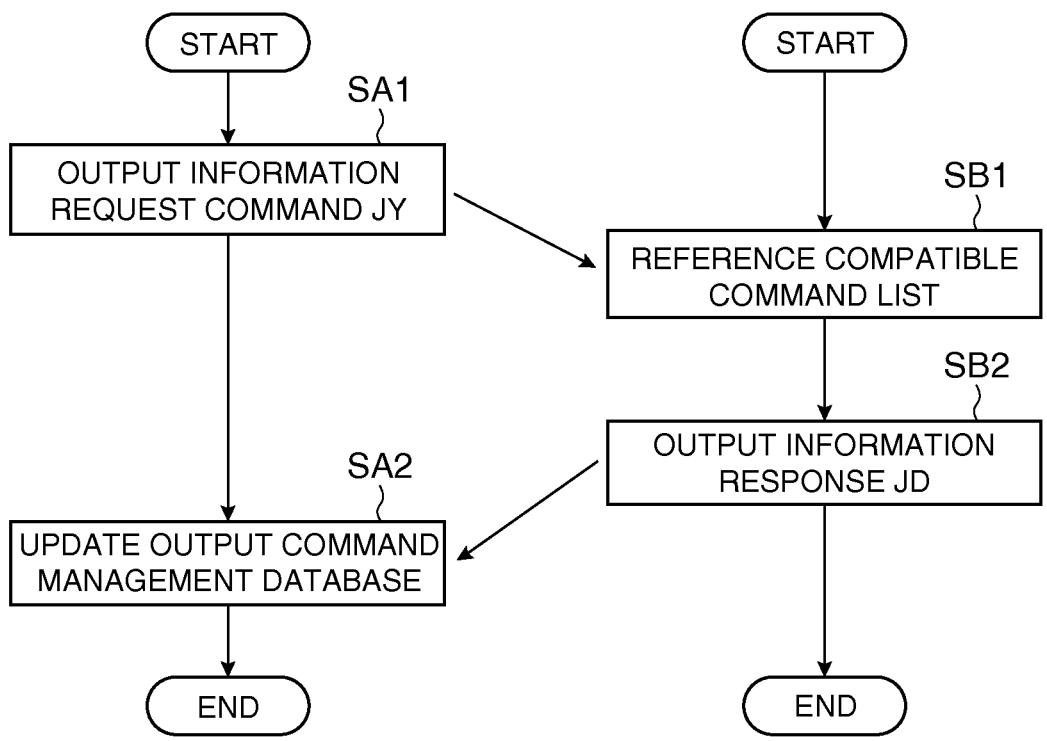
FIG. 3A is a flowchart showing the operation of the host computer.
FIG. 3B is a flow chart showing the operation of the printer.

FIG. 3A and FIG. 3B are flow charts showing the operation of the host computer 11 and the printer P when either an advanced printer P1 or standard printer P2 is newly connected to the host computer 11. FIG. 3A shows the operation of the host computer 11, and FIG. 3B shows the operation of the printer P.

Note that the advanced printer control unit 201 and standard printer control unit 202 are both simply referred to as the printer control unit below unless differentiating therebetween is necessary.

As shown in FIG. 3A, the compatible command acquisition unit 30 of the printer driver execution unit 21 in the control unit 13 of the host computer 11 outputs an information request command JY (step SA1). The function of the compatible command acquisition unit 30 is achieved by cooperation between hardware and software, such as by the CPU executing a program or routine contained in the printer driver.

When the information request command JY is received, the printer control unit reads the compatible command list 31 (step SB1).

Figure 4A:
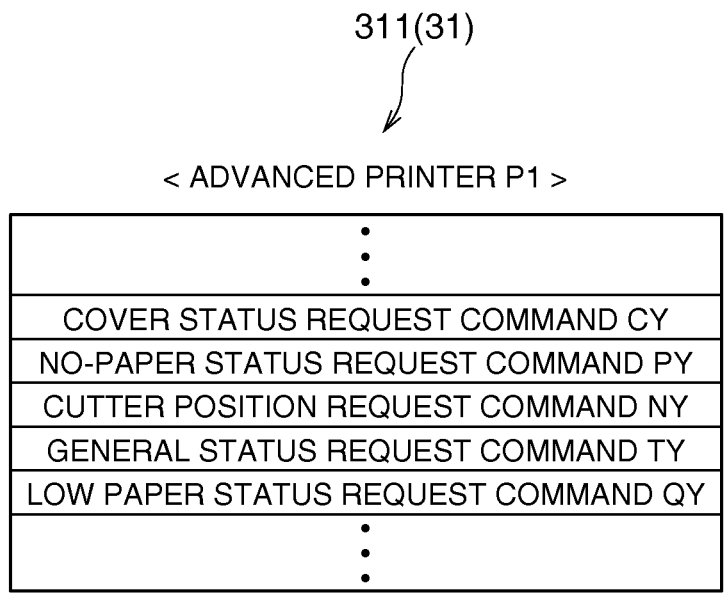
FIG. 4A is a compatible command list for an advanced printer.
Figure 4B:
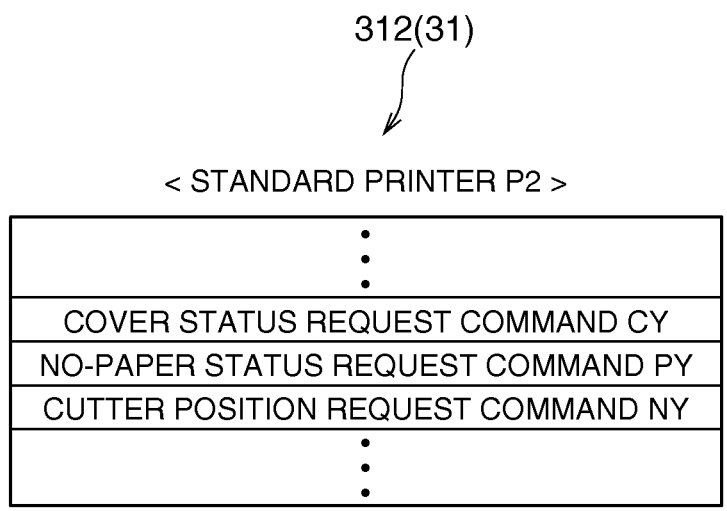
FIG. 4B is a compatible command list for a standard printer.

FIG. 4A and FIG. 4B show examples of compatible command lists 31, FIG. 4A showing an advanced (high level) command list 311 as an example of the compatible command list 31 stored in the advanced printer P1, and FIG. 4B shows a standard (low level) command list 312 as an example of the compatible command list 31 stored in the standard printer P2.

The compatible command list 31 is a list of the names of the commands with which the printer P is compatible. A compatible command is a command that can be read and executed by a function of the currently installed firmware of the printer P, such as commands whereby basic operations are controlled by normal printer P functions, such as by a function of the printer P firmware. As described above, there are differences in the commands with which the advanced printer P1 and standard printer P2 are compatible.

As shown in FIG. 4A, the advanced printer P1 is compatible with five commands, a cover status request command CY, a no-paper status request command PY, a cutter position request command NY, a general status request command TY, and a low paper status request command QY.

When a cover status request command CY is received from the host computer 11, the advanced printer control unit 201 detects the access cover status based on output from the cover sensor 241, and generates and outputs to the host computer 11 a cover status response CD containing information in a specific format indicating the cover status.

When a no-paper status request command PY is received from the host computer 11, the advanced printer control unit 201 detects if there is any paper based on output from the no-paper sensor 251, and generates and outputs to the host computer 11 a no-paper status response PD containing information in a specific format indicating whether or not there is any paper.

When a cutter position request command NY is received from the host computer 11, the advanced printer control unit 201 detects if the movable knife is in the standby position based on output from the cutter position sensor 261, and generates and outputs to the host computer 11 a cutter position response ND containing information in a specific format indicating if the movable knife is in the standby position.

When a general status request command TY is received from the host computer 11, the advanced printer control unit 201 detects the status of the access cover, if a no-paper state has occurred, and if the movable knife is in the standby position, based on output from the cover sensor 241, the no-paper sensor 251, and the cutter position sensor 261. The advanced printer control unit 201 then generates and outputs to the host computer 11 a general status response TD containing information in a specific format indicating the cover status, whether or not there is any paper, and if the movable knife is in the standby position.

More specifically, when the general status request command TY is received, the advanced printer control unit 201 returns the cover status, whether or not there is any paper, and if the movable knife is in the standby position in a single response in the form of the general status response TD.

When a low paper status request command QY is received from the host computer 11, the advanced printer control unit 201 detects if the amount of remaining thermal roll paper has dropped below a specific level based on output from the low paper sensor 271, and generates and outputs to the host computer 11 a low paper status response QD containing information in a specific format indicating whether or not the amount of remaining thermal roll paper is below the specific level.

As shown in FIG. 4B, the standard printer P2 is compatible with at least three commands, the cover status request command CY, no-paper status request command PY, and cutter position request command NY, and is not compatible with two commands, the general status request command TY and low paper status request command QY. The advanced printer P1 and standard printer P2 are different in this respect.

Referring again to FIG. 3B, after reading the compatible command list 31 in step SB1, the printer control unit generates and outputs an information response JD containing information indicating all of the commands that the printer P is compatible with based on the content of the compatible command list 31 (SB2).

The information denoting the commands in the information response JD could, for example, be text strings describing the command names, or individual commands could be assigned to specific bits in a predefined bit train contained in the information response JD, and compatibility with a particular command determined from the state (0 or 1) of the bit assigned to that command. More specifically, the information response JD simply contains information identifying all of the commands that the printer P is compatible with.

When the information response JD is received, the compatible command acquisition unit 30 of the printer driver execution unit 21 updates the command compatibility database 33 based on the input information response JD (SA2).

FIG. 5A and FIG. 5B show examples of the command compatibility database 33, FIG. 5A showing the command compatibility database 33 after being updated when an advanced (high level) printer P1 is connected, and FIG. 5B showing the command compatibility database 33 after being updated when a standard (low level) printer P2 is connected.

In this embodiment of the invention the printer driver execution unit 21 can generate and output all compatible commands of the advanced printer P1 and the standard printer P2. More specifically, the printer driver is developed accordingly.

The command compatibility database 33 is a database for managing which of the commands that the printer driver execution unit 21 can output can also be executed by the connected printer P. While described in further detail below, this embodiment of the invention is configured so that the commands that are compatible with the connected printer are suitably managed on the host computer 11 side, and both the advanced printer P1 and standard printer P2 can be controlled normally by a printer driver execution unit 21 that processes a single printer driver.

As shown in FIG. 5A and FIG. 5B, one record in the command compatibility database 33 has at least two fields, an output command field 34 and a compatibility field 35.

The command compatibility database 33 contains one record for every command that the host computer 11 can output, and the name of the command is stored in the output command field 34 of each record. The compatibility field 35 stores data indicating if the connected printer P is compatible with the command identified in the output command field 34.

The compatible command acquisition unit 30 of the printer driver execution unit 21 updates the command compatibility database 33 based on the received information response JD. Describing the operation of the compatible command acquisition unit 30 at this time more specifically, the compatible command acquisition unit 30 gets information from the information response JD identifying all of the commands with which the printer P that output the information response JD, that is, the printer P that is currently connected, is compatible. Next, processing the records of the command compatibility database 33 one at a time, the compatible command acquisition unit 30 determines if the printer P is compatible with the command identified by the data stored in the output command field 34 of the record being processed. If it is, the compatible command acquisition unit 30 stores a value indicating compatibility (COMPATIBLE in FIG. 5A and FIG. 5B) in the compatibility field 35 of that record. If it is not, the compatible command acquisition unit 30 stores a value indicating incompatibility (INCOMPATIBLE in FIG. 5B) in the compatibility field 35 of that record.

FIG. 5A shows the command compatibility database 33 after it is updated when the advanced printer P1 is connected. Because the advanced printer P1 is compatible with five commands, the cover status request command CY, no-paper status request command PY, cutter position request command NY, general status request command TY, and low paper status request command QY as described above, data indicating that the printer P is compatible with these commands (COMPATIBLE in FIG. 5A and FIG. 5B) is stored in the compatibility field 35 of the records corresponding to these five commands.

FIG. 5B shows the command compatibility database 33 after it is updated when the standard printer P2 is connected. As described above, the advanced printer P1 is compatible with the cover status request command CY, no-paper status request command PY, and cutter position request command NY, but is not compatible with the general status request command TY and low paper status request command QY. As a result, data indicating that the printer P is compatible with these commands (COMPATIBLE in FIG. 5A and FIG. 5B) is stored in the compatibility field 35 of the records for the cover status request command CY, no-paper status request command PY, and cutter position request command NY commands, and data indicating that the printer P is not compatible (INCOMPATIBLE in FIG. 5B) is stored in the compatibility field 35 of the general status request command TY and low paper status request command QY records.

Figure 6:
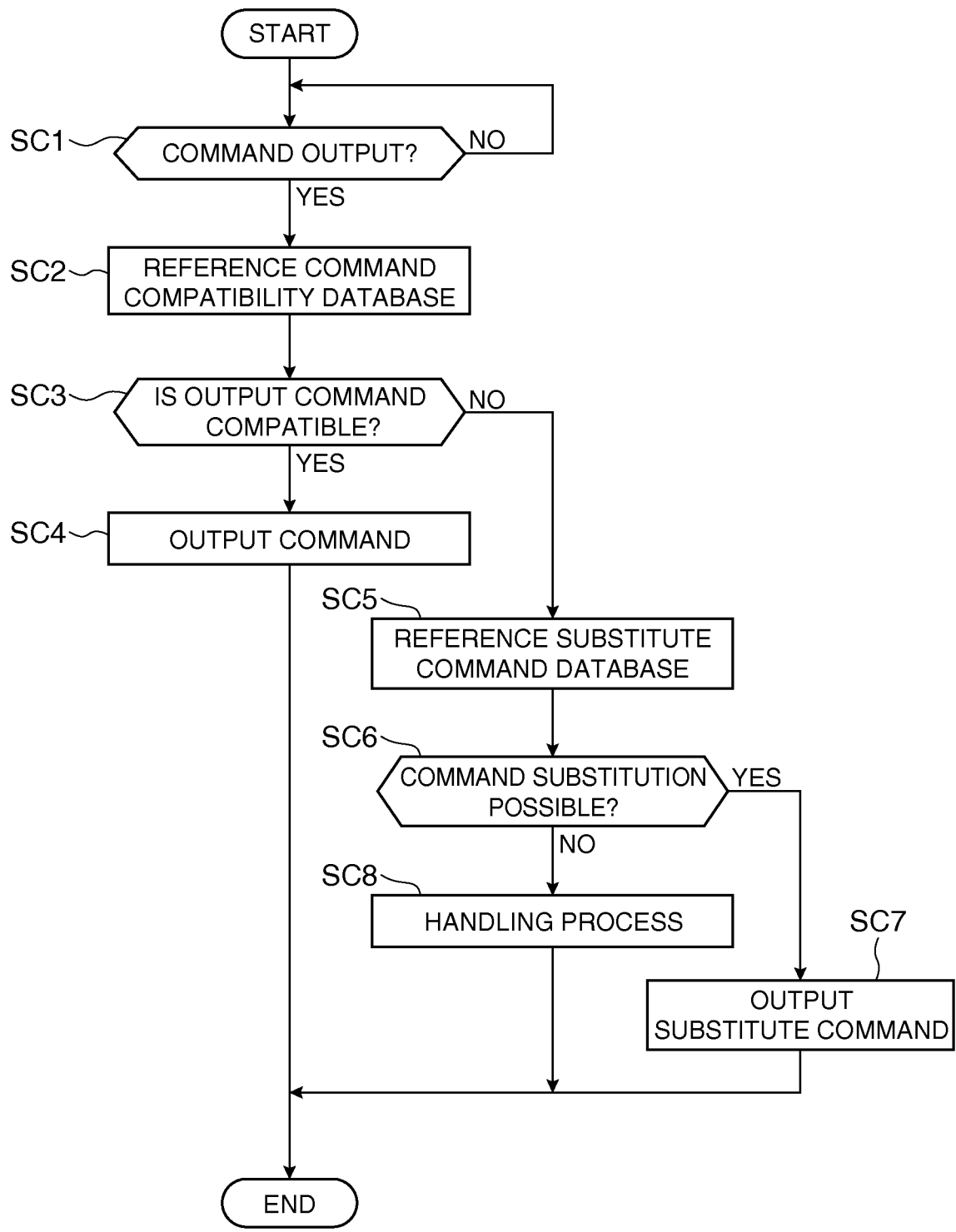
FIG. 6 is a flow chart showing the operation of the host computer.

The operation of the printer driver execution unit 21 (recording control unit) when outputting some command to the printer P is described next with reference to the flow chart in FIG. 6.

The printer driver execution unit 21 monitors whether to output a command (step SC1), and if a command is to be output (step SC1 returns Yes) references the command compatibility database 33 (step SC2). As described above, information enabling determining which commands the currently connected printer P can execute is contained in the command compatibility database 33.

The command that is to be output as determined in step SC1 is referred to below as the "output command."

The printer driver execution unit 21 then determines based on the content of the referenced command compatibility database 33 if the output command is a command with which the connected printer P is compatible (step SC3). If the output command is the general status request command TY, for example, and the advanced printer P1 is connected to the host computer 11, the printer driver execution unit 21 determines that the output command is a command with which the printer P is compatible, but if the standard printer P2 is connected to the host computer 11, the printer driver execution unit 21 determines that the output command is a command with which the printer P is not compatible.

If it is determined in step SC3 that the output command is a command with which the connected printer P is compatible (step SC3 returns Yes), the printer driver execution unit 21 outputs the output command (step SC4) and ends the process.

If it is determined in step SC3 that the output command is not a command with which the connected printer P is compatible (step SC3 returns No), the printer driver execution unit 21 references a substitute command database 37 (step SC5).

FIG. 7 shows an example of a record in the substitute command database 37.

If a particular printer P is not compatible with a particular command, the incompatible command may be replaced by another command with which the connected printer P is compatible. The substitute command database 37 is a database that stores the relationship between commands and substitute commands that can be used instead of the incompatible command.

For example, advanced printer P1 is compatible and standard printer P2 is not compatible with the general status request command TY in this embodiment. If the general status request command TY is output to the advanced printer P1, the advanced printer control unit 201 returns a single general status response TD containing information indicating the cover status, whether or not there is any paper, and if the movable knife is in the standby position as described above. In this embodiment of the invention, therefore, the general status request command TY can be replaced by the cover status request command CY, no-paper status request command PY, and cutter position request command NY. This is because by sequentially outputting the cover status request command CY, no-paper status request command PY, and cutter position request command NY and receiving the responses to these commands, information with the same content as the information acquired by outputting the general status request command TY can be obtained. When the general status request command TY can thus be replaced by the cover status request command CY, no-paper status request command PY, and cutter position request command NY, this relationship between the commands is stored in the substitute command database 37.

As shown in FIG. 7, each record of the substitute command database 37 has at least three fields, a original command field 40, substitute command field 41, and output order field 42.

The original command field 40 stores data (such as the command name) identifying the original command that can be replaced by the substitute commands.

The substitute command field 41 stores the commands that can be substituted for the command identified in the original command field 40 of the same record.

When one command can be replaced by a combination of plural other commands, the output order field 42 stores data including information about the communication order (sequence) in which the plural other commands are output. For example, when the general status request command TY is replaced by the cover status request command CY, no-paper status request command PY, and cutter position request command NY, data including the output order of the commands, the output timing, and rules enabling normal communication with the printer P is stored in the output order field 42.

A command substituted for another command in this embodiment of the invention can be a combination of plural commands as described above, and normal communication including command output is enabled and problems resulting from replacing one command with a combination of plural commands can be desirably prevented by referencing the information stored in the output order field 42 when outputting a combination of plural commands.

Referring again to FIG. 6, after referencing the substitute command database 37 in step SC5, the printer driver execution unit 21 determines if the output command can be replaced by another command (step SC6).

More specifically, the printer driver execution unit 21 looks at the original command fields 40 of the substitute command database 37 to determine if there is a record corresponding to the output command. If a matching record is found, there is a command that can be substituted for the output command. Such a record is referred to below as a "specific record."

The printer driver execution unit 21 then reads the substitute command field 41 of the specific record, and determines if the connected printer P is compatible with all of the commands identified by the data stored in the substitute command field 41. If all of the commands are compatible commands, the printer driver execution unit 21 determines that the output command can be replaced by the other commands, and otherwise determines that those commands cannot be substituted. The printer driver execution unit 21 references the command compatibility database 33 to determine if the connected printer P is compatible with all of the commands identified by the data stored in the substitute command field 41.

If the printer driver execution unit 21 determines in step SC6 that the output command can be replaced with another command (step SC6 returns Yes), it outputs the commands identified by the data stored in the substitute command field 41 in the sequence described by the data stored in the output order field 42 (step SC7). The substitute commands are thus selected and output based on the output command.

For example, if the connected printer P is the standard printer P2 and the output command is the general status request command TY, the printer driver execution unit 21 determines in step SC6 that the general status request command TY can be replaced by other commands, and in step SC7 outputs the cover status request command CY, no-paper status request command PY, and cutter position request command NY in the prescribed order. Because a cutter operation is involved when the thermal roll paper is cut by the cutter mechanism, the printer driver execution unit 21 outputs a cut command after first checking the printer P status by the general status request command TY. In terms of priority, the cover status request command CY is output first because the cutter may collide with other parts and become damaged if the cutter is operated while the cover is open, the no-paper status request command PY is output second because the cutter wears easily if the cutter is operated when there is no paper, and the cutter position request command NY is output third to check the cutter position because this command will not result in cutter damage or wear. By thus outputting commands in order of importance and receiving the responses from the printer P, whether cutting by the cutter mechanism is possible can be determined at an early stage based on the degree of importance.

If it is decided in step SC6 that the output command cannot be replaced with another command (step SC6 returns No), the output command is not a command with which the connected printer P is compatible and cannot be replaced by equivalent commands. The printer driver execution unit 21 therefore does not output the command and executes a process for handling situations in which a command cannot be output (step SC8). This process could, for example, control the display 15 to present a message on the display panel that the command cannot be output, or a process that stops operation due to a process error.

For example, if the connect printer P is standard printer P2 and the output command is the low paper status request command QY, the printer driver execution unit 21 determines in step SC6 that the low paper status request command QY cannot be replaced by another command, and executes a corresponding process in step SC7.

Whether an advanced printer P1 or a standard printer P2 is connected, the printer driver execution unit 21 in this embodiment of the invention thus acquires information about the commands with which the connected printer P is compatible, manages the commands appropriately, and for compatible commands can select and output the appropriate commands to control the printer P normally.

The developer therefore does not need to develop a separate dedicated printer driver for both advanced printer P1 and standard printer P2, and can simply develop a single printer driver with the function described above, thereby reducing development cost and installation trouble, and shortening the time required for development and installation. The user also does not need to select and install a dedicated printer driver for the printer P connected to the host computer 11, and can install only the printer driver developed with the function described in this embodiment of the invention if the host computer 11 may be connected to either advanced printer P1 or standard printer P2. User convenience can thus also be improved.

As described above, the host computer 11 acting as a control device in this embodiment of the invention has a compatible command acquisition unit 30 that acquires from the printer P an information response JD containing information identifying the commands with which the printer P is compatible. The printer driver execution unit 21 of the host computer 11 manages which commands the connected printer P is compatible with in a command compatibility database 33 that is compiled and updated based on information acquired by the compatible command acquisition unit 30, and for commands with which the printer P is compatible, selects and outputs the commands to the printer P to control the printer P.

As a result, the host computer 11 learns and manages which commands the connected printer P is compatible with, and controls the printer P by outputting commands that are compatible with the printer P. As a result, the host computer 11 can use the commands that are compatible with individual printers to control printers P that are compatible with different commands.

The printer P in this embodiment of the invention is configured to return an information response JD containing information identifying the compatible commands when a information request command JY is received. The compatible command acquisition unit 30 can thus get information about the commands the printer P is compatible with by outputting the information request command JY.

The compatible command acquisition unit 30 can therefore get the required information by using the information request command JY to communicate briefly with the printer P. Because the printer P is configured to respond to this information request command JY, and the host computer 11 can thereby get the compatible command information from the printer P, the ease of developing software for controlling the printer P can be improved.

Based on information acquired by the compatible command acquisition unit 30, the printer driver execution unit 21 in this embodiment of the invention generates (updates) and stores a command compatibility database 33 containing information for each of the commands that can be output whether or not the command is a command with which the printer P is compatible, and manages which commands the printer P can use based on this command compatibility database 33.

As a result, the printer driver execution unit 21 can appropriately manage whether the printer P is compatible with any particular command that the printer driver execution unit 21 can output, and can control the printer P using commands that the printer P is compatible with.

When a command that the printer P is not compatible with can be replaced by a command with which the printer P is compatible, the printer driver execution unit 21 according to this embodiment of the invention can also convert the incompatible command to a compatible command and output the compatible command to the printer P.

More particularly, when a command that is incompatible with the printer P is replaced by a combination of plural commands compatible with the printer P, the printer driver execution unit 21 converts the incompatible command to this combination of plural commands and outputs the plural commands to the printer P.

As a result, even if the printer P is not compatible with a particular command, the printer P can be driven to execute processes equivalent to the process of the incompatible command using a plurality of other compatible commands.

The printer driver execution unit 21 in this embodiment of the invention also stores in a substitute command database 37 information describing the command output sequence when a combination of compatible commands is output to the printer P, and outputs the commands according to this output sequence.

As a result, when a combination of compatible commands is output to the printer P and the order of the commands can affect the result of the process on the recording device side, the commands can be sent in an order that will produce the desired result from the substitute processes. In addition, by defining the command output order, the printer driver execution unit 21 can communicate reliably and smoothly with the printer P.

While a preferred embodiment of the invention is described above, it can obviously be modified and adapted in many ways without departing from the scope of the accompanying claims.

For example, the printer driver execution unit 21 can control two printers, an advanced printer P1 and standard printer P2, in the embodiment described above, but any number of printers P that can process commands belonging to the same command system can be controlled by the printer driver execution unit 21. More specifically, by applying the invention to the printer driver, a printer drive unit that runs the printer driver can control any of a plurality of printers that are related in a specific way.

In addition, the printer P is a thermal printer in this embodiment of the invention, but the printer P controlled by the host computer 11 is not limited to a thermal printer, and could obviously be an inkjet printer or dot impact printer, for example.

The printer driver could also be stored on a CD or other removable recording medium and installed therefrom to a hard disk drive or other storage unit 17 of the host computer 11. Further alternatively, the printer driver could be downloaded from another server over a network to which the host computer 11 is connected and installed to the storage unit 17.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device that can connect to a recording device, comprising:
   a storage unit that stores command information including information about the command compatibility of each of a plurality of different recording devices;
   a compatible command acquisition unit that acquires compatible command information from a connected recording device, the compatible command information including information identifying the commands with which the recording device is compatible; and
   a recording control unit that selects and outputs to the recording device a command that is compatible with the recording device based on the compatible command information acquired by the compatible command acquisition unit and the command information stored in the storage unit;
   wherein:
   the recording control unit converts a command that is incompatible with the recording device to a plurality of substitute commands that are compatible with the recording device and in combination can substitute for the incompatible command, and outputs the substitute commands to the recording device, and
   the recording control unit stores in the storage unit information related to an output order of the plural commands that are output when a plurality of commands are combined and output to the recording device to substitute for an incompatible command, and references the storage unit and outputs the plural commands to the recording device based on the information related to the output order.

2. The control device described in claim 1, wherein:
   the recording device returns the compatible command information in response to a request command requesting the compatible command information; and
   the compatible command acquisition unit acquires the compatible command information from the recording device by outputting the request command to the recording device.

3. The control device described in claim 1, wherein:
   the recording control unit stores information that is contained in the compatible command information acquired from the recording device by the compatible command acquisition unit and identifies commands that are compatible with the recording device related to the command information in the storage unit.

4. A control method for a control device that is connectable to a recording device and stores command information including information about the command compatibility of each of a plurality of different recording devices, the control method comprising:
   acquiring compatible command information from a connected recording device, the compatible command information including information identifying the commands with which the recording device is compatible;
   selecting and outputting to the recording device a command that is compatible with the recording device based on the acquired compatible command information and the stored command information;
   converting a command that is incompatible with the recording device to a plurality of substitute commands that are compatible with the recording device and in combination can substitute for the incompatible command, and outputting the substitute commands to the recording device;
   storing information related to an output order of the plural commands that are output when a plurality of commands are combined and output to the recording device to substitute for an incompatible command; and
   outputting the plural commands to the recording device based on the stored information related to the output order.

5. The control method for a control device described in claim 4, wherein:
   the recording device returns the compatible command information in response to a request command requesting the compatible command information; and
   the compatible command information is acquired from the recording device by outputting the request command to the recording device.

6. The control method for a control device described in claim 4, wherein:
   information that is contained in the compatible command information acquired from the recording device, and that identifies commands that are compatible with the recording device, is stored in relation to the command information.

* * * * *